July 28, 1959
R. A. ARMS
2,896,689
APPARATUS FOR FORMING A HELICAL WIRE COIL ON AN
AXIALLY TRAVELING ROTATING MANDREL AND HAVING
FIXED GUIDE GROOVES TO IRON SAID COIL ONTO
SAID MANDREL
Filed Dec. 28, 1954
5 Sheets-Sheet 1
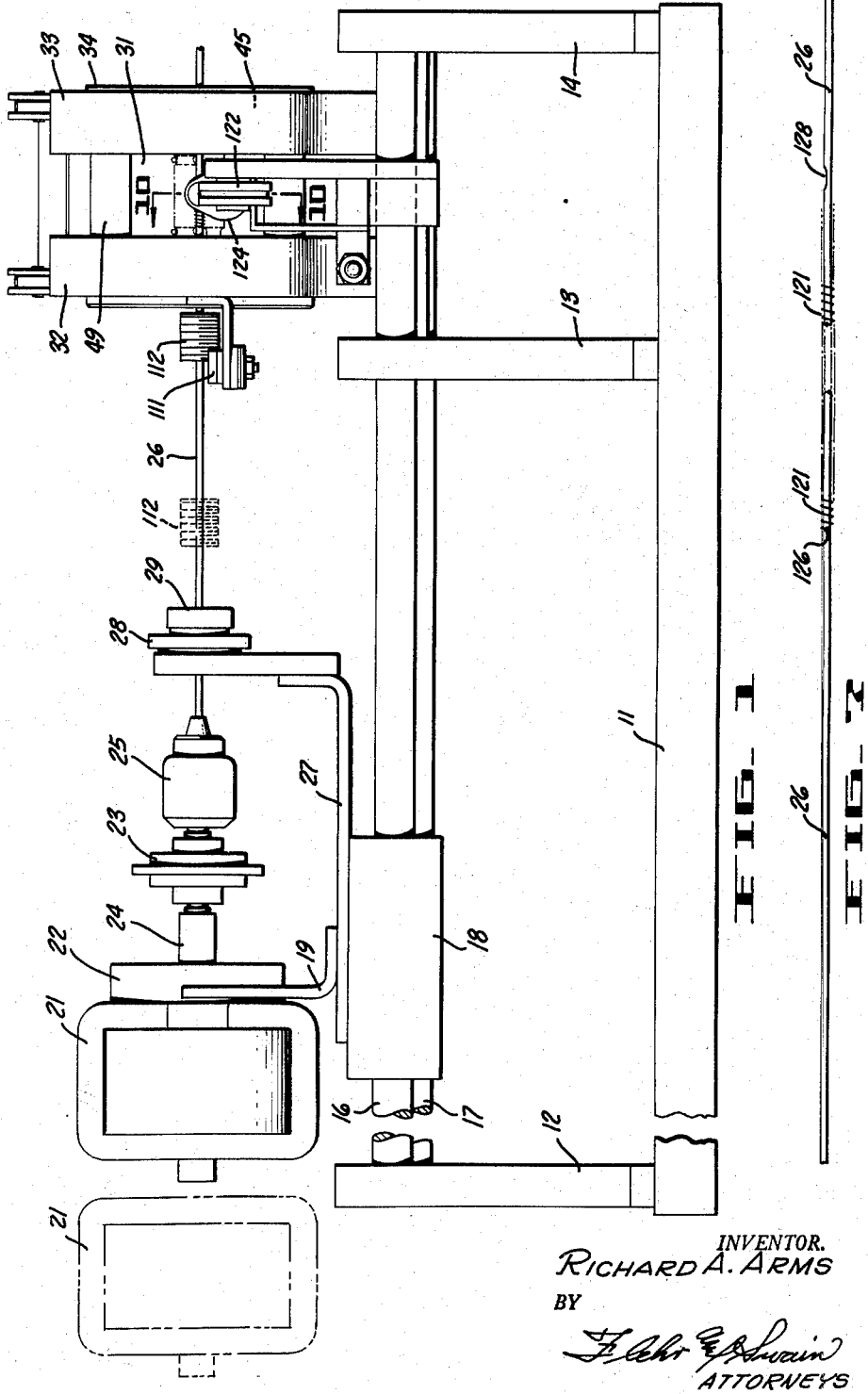
INVENTOR.
RICHARD A. ARMS
BY
ATTORNEYS

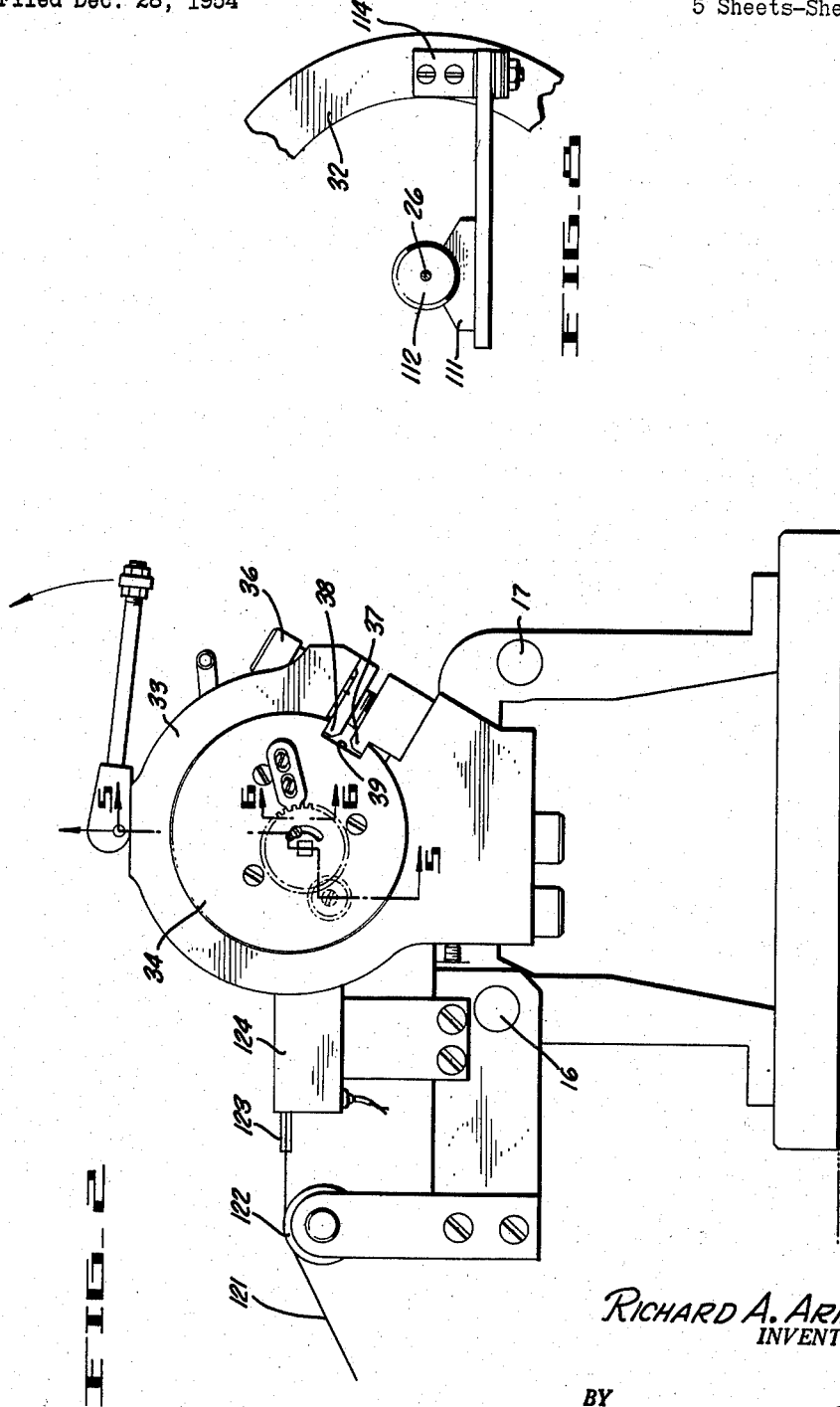

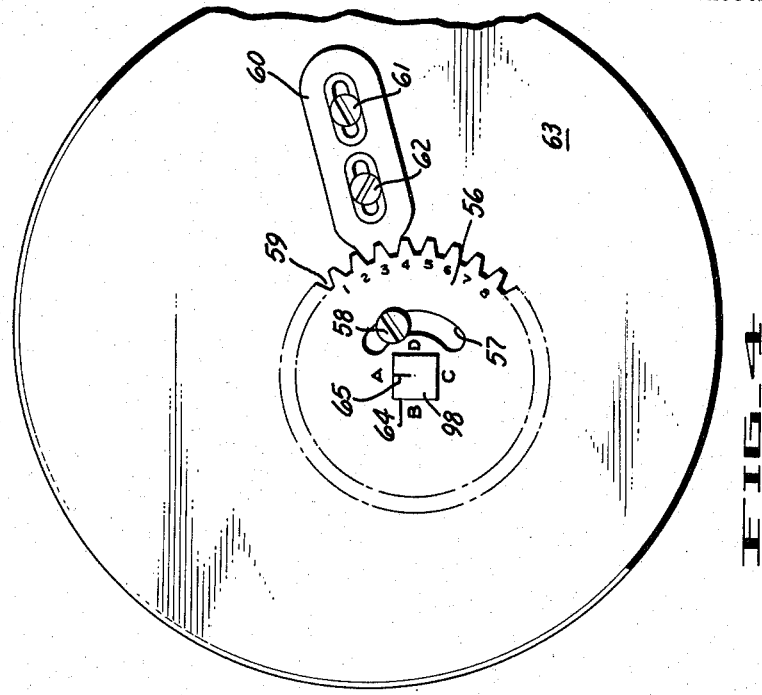

July 28, 1959
R. A. ARMS
2,896,689
APPARATUS FOR FORMING A HELICAL WIRE COIL ON AN
AXIALLY TRAVELING ROTATING MANDREL AND HAVING
FIXED GUIDE GROOVES TO IRON SAID COIL ONTO
SAID MANDREL
Filed Dec. 28, 1954
5 Sheets-Sheet 4
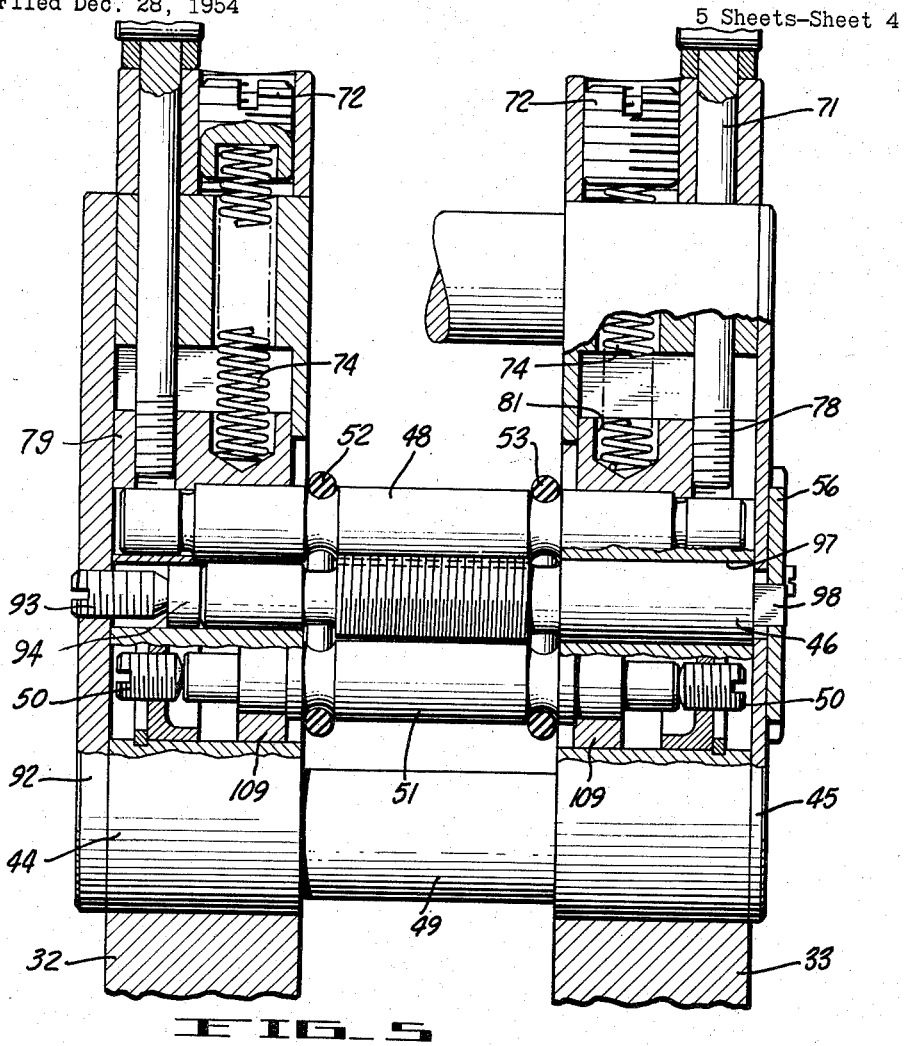
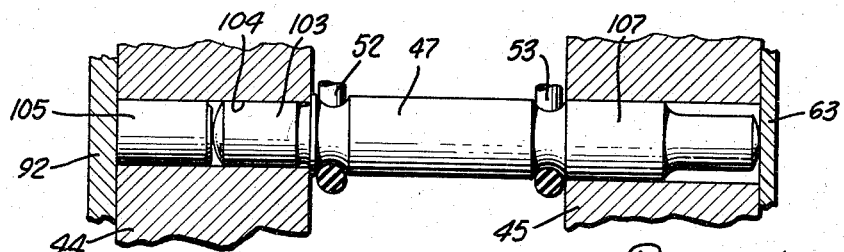
RICHARD A. ARMS
INVENTOR.
BY
ATTORNEYS July 28, 1959           R. A. ARMS           2,896,689
APPARATUS FOR FORMING A HELICAL WIRE COIL ON AN
AXIALLY TRAVELING ROTATING MANDREL AND HAVING
FIXED GUIDE GROOVES TO IRON SAID COIL ONTO
SAID MANDREL
Filed Dec. 28, 1954                          5 Sheets-Sheet 5
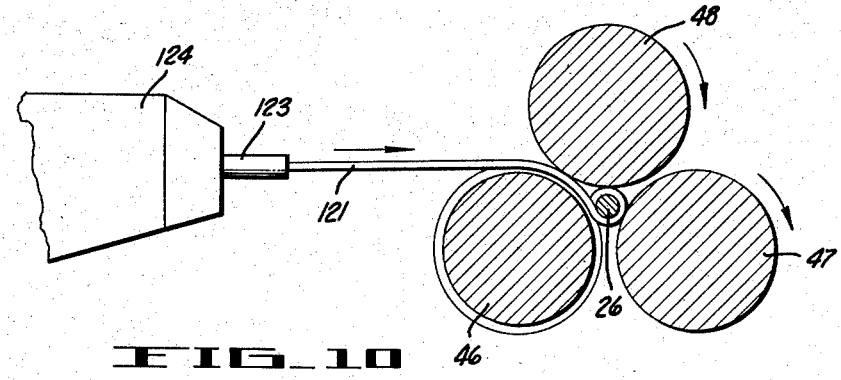
FIG_10
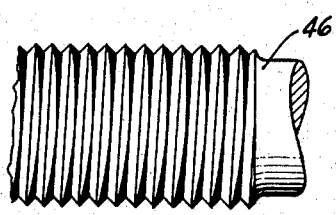
FIG_9
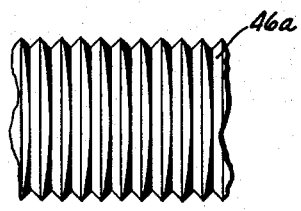
FIG_12
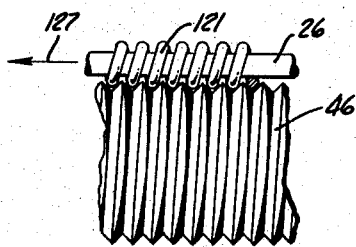
FIG_11
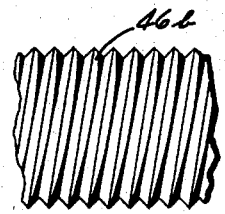
FIG_13
Richard A. Arms
    INVENTOR.
BY
    ATTORNEYS United States Patent Office 2,896,689
Patented July 28, 1959

2,896,689

APPARATUS FOR FORMING A HELICAL WIRE COIL ON AN AXIALLY TRAVELING ROTATING MANDREL AND HAVING FIXED GUIDE GROOVES TO IRON SAID COIL ONTO SAID MANDREL

Richard A. Arms, Menlo Park, Calif., assignor to Hewlett-Packard Company, Palo Alto, Calif., a corporation of California Application December 28, 1954, Serial No. 478,143

10 Claims. (Cl. 153—67)

This invention relates generally to a method and apparatus for winding helical coils having a uniform pitch.

In electronic travelling wave tubes, a wave travelling along a helicoidal conductor is coupled to a coaxially disposed electron stream. The helix is a closely wound wire coil along which the travelling wave progresses and increases, due to its coupling with the electron stream. The relationship of the wave along the helix to the electron stream is analogous to that of a breeze blowing past a progressing wave on the surface of water. It has been found that if the helix has periodic pitch variations a frequency band will exist in which the travelling wave is attenuated. Further, variations in pitch present discontinuities which may set up reflections and make the travelling wave tube oscillatory.

Present methods for winding helices employ a mandrel which is rotated, for example in a lathe, and on which the wire or other elongated material is wound to form the helix. Various means are employed to tension the wire and cause it to wind on the mandrel. The windings tend to spring out away from the mandrel when the tension is removed. Further, the uniformity of the pitch is dependent upon the accuracy of the lead screw of the lathe.

My method and apparatus is predicated upon my discovery that by ironing the wire onto a mandrel and guiding the formed helix over an appreciable distance, the helix formed has uniform pitch throughout its length.

It is a general object of my invention to provide a coil winding method and apparatus which forms a helical coil having a uniform pitch.

A further object of my invention is to provide a method and apparatus for forming a helical coil in which the elongated material is ironed onto the mandrel.

A further object of my invention is to provide a method and apparatus capable of winding a plurality of coils having parallel adjacently spaced convolutions and having a uniform pitch.

These and other objects of my invention will be more clearly apparent from the following description in which the preferred embodiment of the apparatus has been set forth in detail.

Referring to the drawings:

Figure 1 is a side elevational view of apparatus which incorporates my invention;

Figure 2 is an end view of the apparatus of Figure 1;

Figure 3 is an enlarged view of the capsule with the indexing plate removed;

Figure 4 is an enlarged view of the capsule showing the indexing plate;

Figure 5 is an enlarged sectional view taken along the line 5—5 of Figure 2;

Figure 6 is an enlarged sectional view taken along the line 6—6 of Figure 2;

Figure 7 is a side elevational view of a mandrel used in the apparatus;

Figure 8 is an end view of a starting screw and half nut;

Figure 9 is an enlarged view of a guide roll;

Figure 10 is an enlarged sectional view taken along the line 10—10 of Figure 1 showing the path of the elongated material which forms the coil;

Figure 11 is an enlarged view showing the coil as it engages a guide roll;

Figure 12 shows a rotating roll which may be used in place of the fixed guide roll; and Figure 13 shows an enlarged view of a starting screw which may be employed when generating a plurality of helices having parallel spaced convolutions.

In accordance with the present invention, a winding mandrel extends through and rotates with respect to a forming head. The wire or other elongated material to be formed into a helical coil is ironed onto the mandrel as the mandrel moves longitudinally along its axis. The helix which is formed is guided by adjacent grooves for an appreciable distance to maintain torsional tension and accurately space the adjacent convolutions.

Referring to Figure 1, the base plate 11 mounts the supports 12, 13 and 14 which carry the guide rails 16 and 17 (Figure 2). The carriage 18 rides on the rails 16 and 17 and moves longitudinally along the same. A bracket 19 mounts a motor 21 and reduction gears 22 on the carriage 18. The motor may, for example, be an induction motor having sufficient torque to rotate the mandrel to form the helical coil. In one instance, I employed a motor 21 with a nominal speed of 3,600 r.p.m. The reduction gear 22 reduced the speed to permit control of the forming operation. In the instance referred to above, the gear reduction was such that the mandrel speed was 86 r.p.m. A flexible coupler 23 is attached to the motor shaft 24 and has its other side coupled to a chuck 25 which engages one end of the mandrel 26.

Means are provided for aligning the mandrel with the winding head. For example, a second bracket 27 rotatably mounts the nut 28 which has an eccentric hole 29. The flexible coupling 23 allows the chuck 25 to move and align itself with the hole 29. The mandrel 26 extends through the winding head 31.

Preferably, the winding head comprises capsule housing members 32 and 33 and an insertable capsule or winding assembly 34. The capsule or winding assembly will be presently described in conjunction with Figure 2. The winding head is mounted on the rails 16 and 17 between the support members 13 and 14.

Referring to Figure 2, the split ring housing member 33 is provided with a screw 36 which clamps the ring onto the insertable capsule 34. The projections 37 and 38 engage the accommodating screw 39 and prevent rotation of the capsule 34. Referring to Figure 1, the member 32 is identical with member 33 and displaced longitudinally along the apparatus.

The capsule is formed of similar side members 44 and 45 (Figure 3) which are housed within the rings 32 and 33 respectively. The capsule mounts a guide 46, a back roll 47 and a top roll 48 which surround the mandrel 26. The spacers 49 separate and maintain the side members 44 and 45 aligned. The roller 51 is an idler roller over which the belts 52 and 53 (Figure 5) pass, and prevents the belts from riding on the guide 46. The roller 51 is rotatably mounted on the ends of screws 50. The belts may be circular in section (i.e., O-rings) and formed of synthetic rubber or other suitable resilient material.

Referring to Figure 4, the side member 45 has an index plate 56 mounted thereon. The index plate has an arcuate slot 57 of 90° extent, and the screw 58 engages this slot. The periphery of the plate 56 is provided with a plurality of locating teeth 59. These teeth engage the member 60 which is mounted on the side member 44. The member 60 is disengaged from the locating teeth 59 by loosening the screws 61 and 62 engaging the cover plate 63 which is suitably secured to the side member 45, and sliding the member 60 radially outward. By loosening the screw 58 which is secured to the member 63, the index plate 56 may be rotated to any desired position where it is locked by moving the member 60 radially inward. The screws 58, 61 and 62 are then tightened to secure the members. In this particular example, I have provided eight teeth 58 covering 90° of the periphery of the index plate 56 and marked 1–8 as indicated. The index plate permits positioning of the guide 46 to a new position when it is worn down in any one position. This permits positioning of the index plate 56 in any one of eight positions. The square hole 64 engages the end of the guide 46 in a manner to be presently described. The guide may be placed in any one of thirty-two positions by removing the screw 58, lifting the index plate and placing the index mark 65 opposite any one of the positions A, B, C or D.

Referring to Figure 5, the side members 44 and 45 are identical insofar as mounting means for the cylindrically shaped top roll 48 is concerned, and, consequently, the explanation will be in reference to the side member 45. Side member 45 is shown housed within the ring 33 which houses a portion of a rod 71 and screw 72. The adjacent portion of rod 71 passes through a peripheral portion of plate 45, while its lower end 78 is threaded at 78 and engages a bearing 79. The screw 72 has a recessed portion to accommodate one end of the spring 74. The other end of the spring seats in a recess 81 formed in bearing 79. The upper end of the rod 71 is engaged by an eccentric cam (Figure 2) which, when rotated, moves the rod 71 in a vertical direction, compressing the spring 74 and lifting the roll 78.

One end of guide 46 extends into the side member 45. A member 92 suitably attached to the side member 44 seats the set screw 93 which urges the washer 94 against the end portion of the guide 46. The other end of the guide 46 is accommodated within the bore 97 and the squared portion 98 is engaged by the square hole 64 of the index plate. The screw 93 when properly adjusted urges the end portion against the cover plate 63 to thereby provide a lateral thrust and eliminate end-play of the roll as a winding operation is carried out. The belts 52 and 53 ride over the top roll 48 and, as previously explained, do not engage the guide 46 but engage an idler roll 51 and back roll 47 (Figure 6). The idler roller 51 is mounted in bearings 109 housed in side members 44, 45. The belts provide additional pressure on the top roll which causes the elongated material to be tightly ironed onto the mandrel by the three associated rolls, in a manner to be presently described.

Referring to Figure 6, the back roll 47 has the end 103 extending into the side member 44. The plunger 105 abuts the member 92. The other end 107 of the roll 47 extends into plate 45 and abuts the end plate 63. The relative position of the various rolls described with reference to Figures 5 and 6 is clearly shown in Figure 3.

The guide 46 is provided with uniformly spaced grooves along its point of contact with the helix. These grooves engage the helix as it is formed, determine the pitch, maintain uniform spacing of the adjacent convolutions, and provide a frictional drag which maintains the formed helix in tension. For example, the guide 46 may be in the form of a cylinder or roll and threaded as shown in Figure 9 to form the guide grooves. Only the portion adjacent to the helix will engage therewith.

In Figure 8, I have shown a half nut 111 together with a starting screw 112. The starting screw 112 is bored to accommodate the mandrel 26. After the mandrel 26 is passed through the starting screw 112 and properly located, the starting screw is fixed with respect to the mandrel by means of a set screw (not shown). The half nut and arm are mounted on the side member 45 by means of bracket 114 (Figure 1).

Referring again to Figure 2, the wire or other elongated material 121 passes over a guide roller 122 which is grooved (Figure 1) to guide the material. The material then passes through the tubing 123 which is imbedded within an electrical heater 124. The heater 124 heats the elongated material prior to its being ironed onto the mandrel to relieve stresses. It has been found that breakage is considerably reduced by such heating of the material.

Operation of the coil winder may be more clearly understood with reference to Figures 10 and 11. The wire or other elongated material 121 is shown passing through the tubing 123 and heater 124. The free end of the wire 126 is threaded through the hole 126 (Figure 7) of the mandrel. The wire then rides over the guide 46, seats within the groove between two adjacent groove portions. Then the wire passes between the mandrel 26 and the rear roller 147 and the top roll 48. As the mandrel 26 is rotated, the elongated material is bent beyond its elastic limit and pressed to the mandrel by the joint action of the guide 46 and rolls 47 and 48. As previously described, the roll 48 is pressed against the top surface of the helical coil by the joint action of the O-ring belts and the springs 74. During the winding of the first few turns of the coil, the lead screw 112 engages the half nut 111 and advances the mandrel longitudinally. The advance per revolution of the mandrel is dependent upon the pitch of the lead screw which is threaded to advance the mandrel a distance equal to the spacing of the guide grooves per revolution. As the lead screw 112 rotates, it travels with the mandrel 26 in an axial direction toward the left in Figure 1 before it disengages from the nut 111. At this time, a portion of the helix has been formed as shown in Figure 11. The adjacent convolutions of the helix engage adjacent grooves of the fixed guide 46 and apply a thrust which moves the mandrel 26 and carriage 18 in an axial direction as shown by the arrow 127. In this manner, the helix continues to wind with a pitch that corresponds to the initial pitch imparted by the lead screw. When the helix is completed, the wire is wound over the flat portion 128 of the mandrel (Figure 7) where it locks itself in position. The helical coil and mandrel are then removed and placed in an oven for heat treatment to relieve all strains and stresses imparted during the ironing operation. It has been found advantageous, when forming a coil, to unwind the length of material required from the storage spool and cut in prior to beginning the forming operation.

As the wire is ironed onto the mandrel it is drawn past the first groove and pressed by the back and top rolls. This stresses the wire beyond its elastic limit. The grooves and rolls engage and press the formed helix over a distance corresponding to the length of the rolls. This keeps the helix under tension and does not allow it to unwind. The engagement with the grooves over this appreciable distance performs an averaging operation which makes the spacing between the convolutions uniform. Thus a helix having a uniform pitch results and the possibility of periodic variations is eliminated.

Apparatus was constructed as described and employed a mandrel .104 inch in diameter. The guide 46 was .375 inch in diameter and 1 inch long and threaded with 40 turns per inch. Tungsten wire .015 inch in diameter was formed into a helix. The helix was placed in a comparator capable of reading to $50 \times 10^6$ inches and the uniformity of the spacing of adjacent convolutions was within the accuracy of the comparator.

As described above, the guide 46 shown in Figure 9 may be threaded with a pitch which corresponds to the spacing desired for the guide grooves. It is to be noted here that the uniformity of the pitch need not be comparable to that desired for the helix since the helix passes over a considerable number of guide grooves and any variations are averaged. It is possible to replace the fixed guide by a roll which rotates. In this instance, the roll will have the form shown in Figure 12 wherein a series of circumferential grooves are equally spaced and cut into the roll 46A. The spacing of the grooves will again correspond to the displacement of adjacent helix convolutions. This embodiment does not require an indexing plate to position the guide roll in the various positions because the wear is distributed uniformly along the circumferential grooves.

It is also possible to wind multiple helices having parallel spaced adjacent convolutions. For example, the lead screw 112 may have a triple thread to advance the mandrel at a more rapid longitudinal velocity. In this instance, three wires are brought onto the mandrel and, after the initial winding, these wires will engage adjacent grooves in the roll 46 and continue to advance at the initial rate. In this manner, the pitch of the helices will be held constant and the three helices will be generated with adjacent parallel convolutions.

By changing the spacings of the guide grooves, a helix having any desired pitch may be formed. Generally, it is advantageous to have a series of capsules 34 having guide rolls with grooves having different spacings whereby a rapid change may be made for winding helices of various pitches.

Thus it is seen that I have provided a method and apparatus for winding a uniform helical coil which is predicated upon my discovery that by ironing the material onto the mandrel and engaging the formed helix over a substantial distance a helix having a uniform pitch is formed.

I claim:

1. In apparatus adapted to form elongated material into helical coils having uniform pitch, a driven mandrel on which said coils are wound, means for driving said mandrel, said mandrel and driving means adapted to move axially, as a coil is being formed, a winding head adapted to receive said mandrel, non-rotatably mounted guide means having a plurality of substantially equally spaced grooves mounted in said winding head, said grooves having a V-shaped configuration and a depth such that the elongated material protrudes therefrom whereby the outer surface of the elongated material is engaged by the adjacent groove portion to provide a frictional drag on the material which serves to iron the same onto the mandrel, said grooves engaging adjacent convolutions of the coil over a substantial axial distance as said coil is being formed to determine the pitch and average out any variations therein, a first cylindrical means rotatably mounted in said winding head and disposed adjacent said mandrel whereby it presses against the coil, and a second cylindrical means yieldably and rotatably mounted in said winding head and serving to yieldably bearing against the coil.

2. Apparatus as in claim 1 wherein said guide means comprise a threaded cylindrical roll.

3. Apparatus as in claim 2 together with an index plate carried on said head and adapted to engage said guide means, said guide means being non-rotatably mounted to the index plate, rotation of said index plate causing the rotation of said threaded cylindrical roll to position different portions of its surface in work engaging position, and means for locking said index plate in any one of a plurality of angular positions.

4. Apparatus adapted to form elongated material into helical coils, said apparatus having a driven mandrel on which said coils are wound, means for driving said mandrel, said mandrel and driving means adapted to move axially as a coil is being formed, a winding head adapted to receive said mandrel and comprising a pair of spaced side members, bearing means movably mounted in said side members, means for yieldably urging said bearings towards the axis, non-rotatably mounted guide means having a plurality of equally spaced grooves mounted between said side members, said grooves having a V-shaped configuration and a depth such that the elongated material protrudes therefrom whereby the outer surface of the elongated material is engaged by the adjacent groove portion to provide a frictional drag on the material which serves to iron the same onto the mandrel, said grooves engaging the material of adjacent convolutions of the coil over a substantial axial distance as said coil is being formed to determine the pitch and average out any variations therein, first cylindrical means rotatably mounted between said side members and disposed adjacent said mandrel whereby it is adapted to press against the coil, and a second cylindrical means rotatably mounted in said bearing means and serving to yieldably press against the coil.

5. Apparatus as in claim 4 together with means for lifting said bearings to lift the second cylindrical means thereby permitting insertion of a mandrel.

6. Apparatus as in claim 5 wherein said guide means comprise a threaded cylindrical roll.

7. Apparatus as in claim 6 together with an index plate carried on said head and adapted to engage said guide means, said guide means being non-rotatably mounted to the index plate, rotation of said index plate causing the rotation of said threaded cylindrical roll to position different portions of its surface in work engaging position, and means for locking said index plate in any one of a plurality of angular positions.

8. Apparatus adapted to form elongated material into helical coils having a uniform pitch, said apparatus having a driven mandrel on which said coils are wound, means for driving said mandrel, said mandrel and driving means adapted to move axially as a coil is being formed, a winding head comprising a capsule housing and an insertable capsule, said capsule comprising a pair of spaced side members adapted to receive the mandrel, non-rotatably mounted guide means having a plurality of equally spaced grooves mounted between said side members, said grooves having a V-shaped configuration and a depth such that the elongated material protrudes therefrom whereby the outer surface of the elongated material is engaged by the adjacent groove portion to provide a frictional drag on the material which serves to iron the same onto the mandrel, said grooves engaging the material of adjacent convolutions of the coil over a substantial axial distance as said coil is being formed to determine the pitch and average out any variations therein, a first cylindrical means rotatably mounted between said side members and disposed adjacent said mandrel whereby it presses against the coil, and a second cylindrical means yieldably and rotatably mounted between said side members and serving to yieldably press against the coil.

9. Apparatus as in claim 8 wherein said guide means comprise a threaded cylindrical roll.

10. Apparatus as in claim 9 together with an index plate carried on said head and adapted to engage said guide means, said guide means being non-rotatably mounted to the index plate, rotation of said index plate causing the rotation of said threaded cylindrical roll to position different portions of its surface in work engaging position, and means for locking said index plate in any one of a plurality of angular positions.

(References on following page)

References Cited in the file of this patent

UNITED STATES PATENTS

| | | |
|---|---|---|
| 153,388 | Smith | July 21, 1874 |
| 486,624 | Burton | Nov. 22, 1892 |
| 531,673 | Almond | Jan. 1, 1895 |
| 892,659 | Getty | July 7, 1908 |
| 892,660 | Getty | July 7, 1908 |
| 1,139,872 | James | May 18, 1915 |
| 1,394,095 | Knoth | Oct. 18, 1921 |
| 1,542,592 | Velting | June 16, 1925 |
| 1,709,707 | Bragdon | Apr. 16, 1929 |
| 2,182,844 | Grumbacher | Dec. 12, 1939 |
| 2,360,047 | Caminez | Oct. 10, 1944 |
| 2,371,674 | Caminez | Mar. 20, 1945 |
| 2,388,401 | Freundlich | Nov. 6, 1945 |
| 2,450,324 | Wilson | Sept. 28, 1948 |
| 2,523,015 | Greiner | Sept. 19, 1950 |